(12) United States Patent
Xu

(10) Patent No.: US 9,400,378 B2
(45) Date of Patent: Jul. 26, 2016

(54) ROTARY FLEXURE MICROPOSITIONING STAGE WITH LARGE ROTATIONAL RANGE

(71) Applicant: UNIVERSITY OF MACAU, Taipa, Macau (CN)

(72) Inventor: Qingsong Xu, Taipa (CN)

(73) Assignee: UNIVERSITY OF MACAU, Taipa, Macau (CN)

( * ) Notice: Subject to any disclaimer, the term of this patent is extended or adjusted under 35 U.S.C. 154(b) by 0 days.

(21) Appl. No.: 14/454,845

(22) Filed: Aug. 8, 2014

(65) Prior Publication Data

US 2016/0041378 A1 Feb. 11, 2016

(51) Int. Cl.
*G02B 21/26* (2006.01)
*F16M 11/18* (2006.01)
*G02B 21/32* (2006.01)
*G02B 21/34* (2006.01)

(52) U.S. Cl.
CPC ............... *G02B 21/26* (2013.01); *F16M 11/18* (2013.01); *G02B 21/32* (2013.01); *G02B 21/34* (2013.01)

(58) Field of Classification Search
CPC ........ F16C 11/12; G02B 21/26; G02B 21/32; G02B 21/34; F16M 11/18
See application file for complete search history.

(56) References Cited

U.S. PATENT DOCUMENTS

| | | | | | |
|---|---|---|---|---|---|
| 1,916,609 | A * | 7/1933 | Emmons | ................ | G02B 21/26 33/1 AA |
| 3,625,586 | A * | 12/1971 | Olexa | ..................... | G02B 21/26 269/57 |
| 4,589,741 | A * | 5/1986 | Clegg | ..................... | G02B 21/26 108/103 |
| 5,749,556 | A * | 5/1998 | Matsuoka | ............... | F16M 11/08 248/349.1 |
| 6,160,662 | A * | 12/2000 | Uchida | .............. | G02B 21/0088 359/368 |
| 6,896,330 | B1 * | 5/2005 | Yu | .......................... | A47C 15/00 248/349.1 |
| 8,899,869 | B2 * | 12/2014 | Valois | ..................... | F16C 11/12 403/1 |
| 2006/0016955 | A1 * | 1/2006 | Kao | ......................... | A47F 5/025 248/521 |
| 2009/0031926 | A1 * | 2/2009 | Goda | ..................... | A47B 11/00 108/22 |
| 2009/0045312 | A1 * | 2/2009 | Holt | ........................ | B60S 13/02 248/349.1 |
| 2012/0034027 | A1 * | 2/2012 | Valois | ..................... | F16C 11/12 403/291 |
| 2012/0048156 | A1 * | 3/2012 | Zhang | ................... | F16M 11/043 108/91 |
| 2013/0327913 | A1 * | 12/2013 | Fruhm | ...................... | A63J 1/00 248/349.1 |

OTHER PUBLICATIONS

Lobontiu, N., and Garcia, E., 2005. "Circular-hinge line element for finite element analysis of compliant mechanisms". J. Mech. Des., 127 (4), pp. 7 66-7 7 3.

(Continued)

*Primary Examiner* — Jeanette E Chapman
(74) *Attorney, Agent, or Firm* — Nath, Goldberg & Meyer; Jerald L. Meyer; Stanley N. Protigal

(57) ABSTRACT

A stage assembly for supporting articles, the stage assembly uses one or more intermediate stage modules. Each module has a plurality of compound radial flexures (CRFs), extending radially from a base or an intermediate stage module, and allowing rotational movement about a center axis. The CRFs each have a flat profile, with a long side of the profile aligned perpendicularly to the direction of rotation of the stage modules so that the CRFs have more flexibility in the direction of rotation than obliquely to the direction of rotation. Movement of a last of the stage modules results in deflection of the CRFs between each successive stage module, with partial movement of each stage module between the base and the last of the stage modules, the last of the stage modules provided as a primary stage module.

12 Claims, 14 Drawing Sheets
(12 of 14 Drawing Sheet(s) Filed in Color)

(56) References Cited

OTHER PUBLICATIONS

Thoi, K.B., and Kim, D.H., 2006. "Monolithic parallel linear compliant mechanism for two axes ultraprecision linear motion". Rev. Sci. Instrumt., 77(6), p. 065 106.

Polit, S., and Dong, J., 2009. "Design of high-bandwidth high-precision flexure-based nanopositioning modules". J. Manuf. Syst., 28(2-3), pp. 7 1-77.

Xu, Q., 2012. "New flexure parallel-kinematic micropositioning system with large workspace". IEEE Trans. Robot., 28 (2), pp. 478491.

Wang, H., and Zhang, X., 2008. "Input coupling analysis and optimal design of a 3-DOF compliant micropositioning stage". Mech. Mach. Theory, a3($, pp. 400-410.

Qin, Y., Shirinzadeh, 8., Zhang, D., and Tian, Y., 2013. "Design and kinematics modeling of a novel 3-DOF monolithic manipulator featuring improved scott-russell mechanisms". J. Mech. Des., 135(10), p. 101004.

Wang, Y.C., and Chang, S.H., 2006. "Design and performance of a piezoelectric actuated precise rotary positioner". Rev. Sci. Instrutn., 77(10), p. 105101.

Hwang, D., Byun, J., Jeong, J., and Lee, M.G., 201 1. "Robust design and performance verification of an inplane XY [theta] micropositioning stage". IEEE Trans. Nanotechnology., 10(6), pp. 1412-1423.

Kim, K., Ahn, D., and Gweon, D.,2012. "Optimal design of a I-rotational DOF flexure joint for a 3-DOF H-type stage". Mechatronics, 22(I), pp. 24-32.

Luo, H.P., Zhang, B., and Zhou,Z.X., 2008. 'A rotary flexural bearing for micromanufacturing. CIRP Ann. Manuf. Techn., 57, pp. 179-182.

tITI B\, S., Zhao, S., and Zhu, X.,2010. "Dimensionless design graphs for three types of annulus-shaped flexure hinges". Precis. Eng., 34(3), pp. 659-666.

Choi, Y.J., Sreenivasan, S.V., and Choi, B.J., "Kinematic design of large displacement precision XY positioning stage by using cross strip flexure joints and over-constrained mechanism", Mechanisms and Machine Theory, vol. 43(6), pp. 724-737.

Cannon, J. R., and Howell, L. L, 2005. "A compliant contact-aided revolute joint". Mech. Mach. Theory, 40(11), pp. 1273-1293.

Pei, X., Yu, J., Zong, G., Bi, S., and Su, H., 2009. "The modeling of cartwheel flexural hinges". Mech. Mach. Theory, 44 (10), pp. 1900-1909.

Limaye, P., Ramu, G., Pamulapati, S., and Ananthasuresh, G. K., 2012. "A compliant mechanism kit with flexible beams and connectors along with analysis and optimal synthesis procedures". Mech. Mach. Theory, 49, pp. 21-39.

Lan, C.-C., Wang, J.-H., and Fan, C.-H., 2009. "Optimal design of rotary manipulators using shape memory alloy wire actuated flexures". Sens. Actuator A-Phys., 153(2), pp. 258-266.

Li, J., Zhao, H., Qu, H., Cui, T., Fu, L., Huang, H., Ren, L., and Fan, Z., 2013. "A piezoelectric-driven rotary actuator by means of inchworm motion". Sens. Actuator A-Phys., 194, pp. 269-276.

Xu, Q., 2013. "Design and implementation of a novel rotary micropositioning system driven by linear voice coil motor". Rev. Sci. Instrum., 84(5), p. 055001.

DiBiasio, C. M., and Culpepper, M. L., 2012. "A building block synthesis approach for precision flexure systems with integrated, strain-based position sensing". Precis. Eng., 36(4), pp. 673-679.

Xu, Q., Li, Y., and Xi, N., 2009. "Design, fabrication, and visual servo control of an XY parallel micromanipulator with piezo-actuation". IEEE Trans. Automat Sci. Eng., 6(4), pp. 710-719.

* cited by examiner

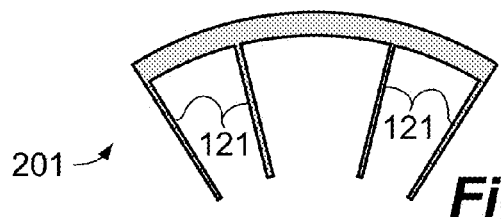
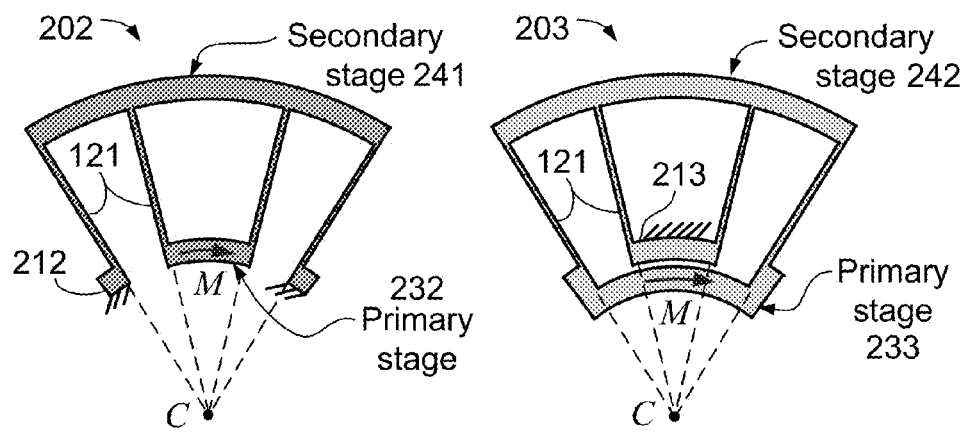
Fig. 2A
Fig. 2B    Fig. 2C
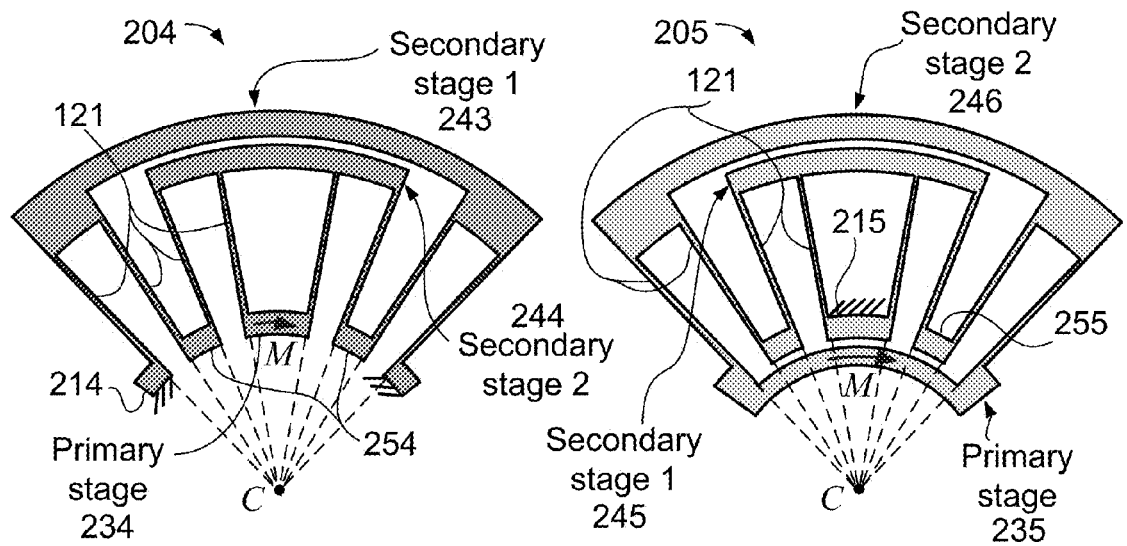
Fig. 2D    Fig. 2E

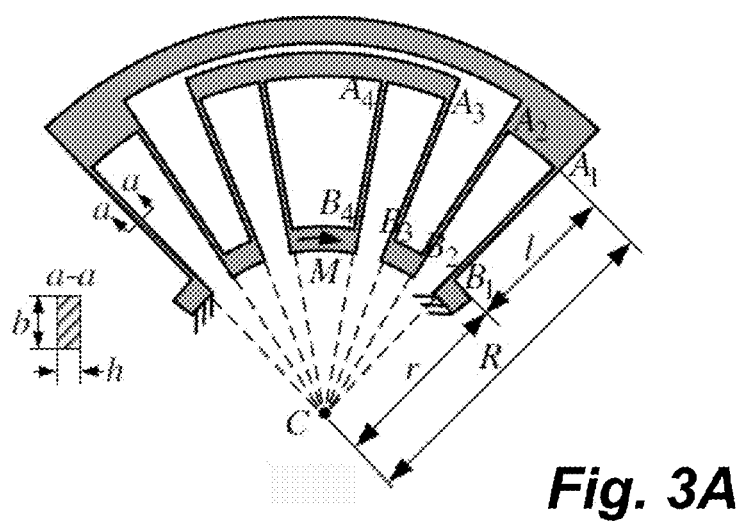
Fig. 3A
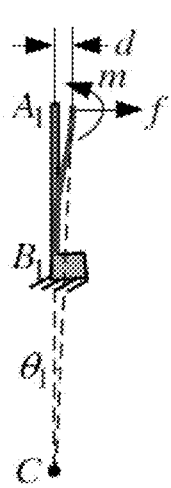
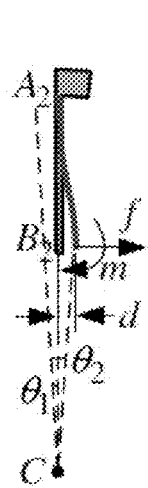
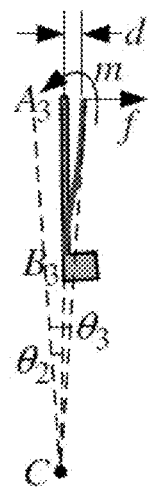
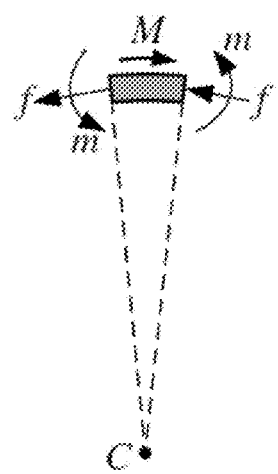
Fig. 3B  Fig. 3D  Fig. 3F
  Fig. 3C  Fig. 3E

ROTARY FLEXURE MICROPOSITIONING STAGE WITH LARGE ROTATIONAL RANGE

BACKGROUND

1. Field

The present disclosure relates to positioning devices such as microscope stages. More particularly, the disclosure relates to a compact rotary flexure micropositioning stage with a large rotational range, and to a rotary stage which is based upon multiple-segment compound radial flexures.

2. Background

Micropositioning devices are widely employed to realize a precise positioning of the end-effectors dedicated to precision manipulation and assembly applications. Particularly, flexure-based compliant mechanisms have been extensively exploited due to their attractive merits in terms of no backlash, no friction, no wear, low cost, and vacuum compatibility. Unlike traditional mechanical joints, the repeatable output motion of a flexure mechanism is delivered by the elastic deformation of the material. Hence, the structural parameters of the flexure mechanism need to be carefully designed so that the material operates in the elastic domain without plastic deformation nor fracture failure.

A number of translational flexure micropositioning platforms have been reported in the literature and some of them have been commercialized on the market. In contrast, relatively limited works have been made toward the rotational micropositioning stage development. In the literature, some flexure stages providing combined translational and rotational motions have been reported. The present disclosure is focused on the design and development of rotary flexure stages which are capable of pure rotational motion. Several rotary flexure stages have been proposed previously; however, these stages are only able to deliver a small rotational angle less than 1°. In practice, many applications demand a rotary stage with a large rotational range. How to achieve a large rotational range by using flexure-based compliant mechanisms is a major challenge.

It is known that a flexure rotary stage can be devised using leaf flexures with fixed-fixed constraint. The rotational range of such devices is limited due to the over-constrained mechanism. To enlarge the rotational range, several rotary bearings have been presented and some rotary stages driven by smart material-based actuators (e.g., piezoelectric actuator and shape memory alloy) have been devised. Alternatively, the basic module of radial flexure can be employed to construct the compound radial flexures (CRFs). Yet, to achieve a large rotational range, the CRFs should be designed with a larger length, smaller thickness, and larger outer radius. Despite this, these physical parameters are restricted by the compactness requirement, manufacturing tolerance, and minimum stiffness requirement in practice. Thus, it is difficult to achieve a large rotational range while maintaining a compact stage size by using CRFs.

SUMMARY

1. A stage assembly for supporting articles comprises a base positioned at a first radius, one or more intermediate stage modules and a last of the stage modules. The first intermediate stage module is positioned at a second radius positioned radially outward displaced from the first radius, and a first plurality of compound radial flexures (CRFs) support the first intermediate stage module from a base. The CRFs extending radially outwardly displaced from the base to the first intermediate stage module and allow rotational movement of the intermediate stage module about a center axis. A second stage module is located substantially at the second radius and a second plurality of CRFs support the second stage module from the first stage module and allow rotational movement of the second stage module with respect to the first intermediate stage module about the center axis. The CRFs each have a flat profile comprising a short side of the profile aligned planarly in a direction of the rotation of the stage modules and a long side aligned perpendicularly to the direction of rotation of the stage modules. The flat profiles provide the CRFs with more flexibility in the direction of rotation than obliquely to the direction of rotation. Movement of a last of the stage modules results in deflection of the CRFs between each successive stage module, with partial movement of each stage module between the base and the last of the stage modules. The last of the stage modules provide a primary stage module.

BRIEF DESCRIPTION OF THE DRAWINGS

The file of this patent contains at least one drawing executed in color. Copies of this patent with color drawing(s) will be provided by the Office upon request and payment of the necessary fee.

FIGS. 2A-2E are diagrams showing radial flexures, arranged in a progression of as a flow diagram of the radial flexures using an inner base support.

FIGS. 3A-3F are diagrams showing parameters and free-body diagrams of a multiple-segment compound radial flexure (MCRF), showing parameters and free-body diagrams. FIG. 3A shows an external moment applied at the primary stage of the MCRF. FIGS. 3B-3E show the deformations of four flexures. The free-body diagram of the primary stage of the MCRF is given in FIG. 3F.

FIG. 4A shows an inner frame used as an output stage. FIG. 4B shows the outer frame is used as output stage.

FIG. 6A shows the result of total deformation. FIG. 6B shows the result of distribution of equivalent stress (FIG. 6B). FIG. 6C shows different stages of the movement, with the solid lines showing the undeformed wireframe of the rotary stage before the movement.

FIG. 9A shows the system and FIG. 9B shows details of flexure arms used on the micropositioning stage.

FIG. 11A is a circuit trace of a step signal applied to a VCM driver of the strain gauge. FIG. 11B is a circuit trace of the strain sensor's output.

FIG. 13A shows the input voltage over time. FIG. 13B shows output angle over time, as measured by strain sensor. FIG. 13C shows an output-input hysteresis of the measured angle based on input voltage.

FIG. 14A shows a magnitude plot. FIG. 14B shows a phase plot (lower).

FIG. 15A is a plan view and FIG. 15B is an oblique view.

DETAILED DESCRIPTION

Overview

Figure 1A:
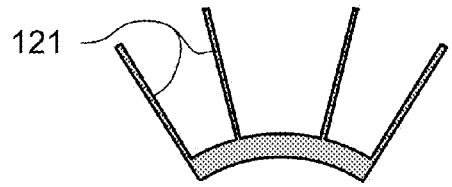
FIGS. 1A-1E are diagrams showing radial flexures, arranged in a progression of as a flow diagram of the radial flexures using an outer base support.
Figure 1B:
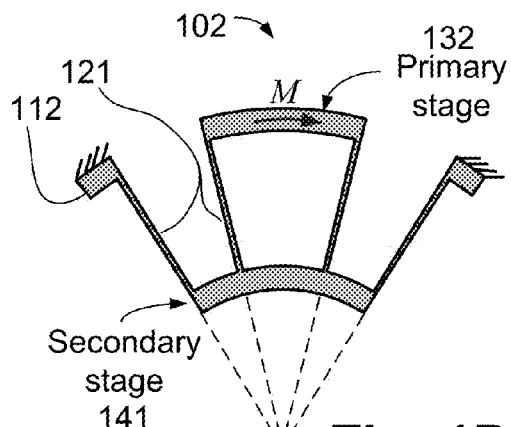
Figure 1C:
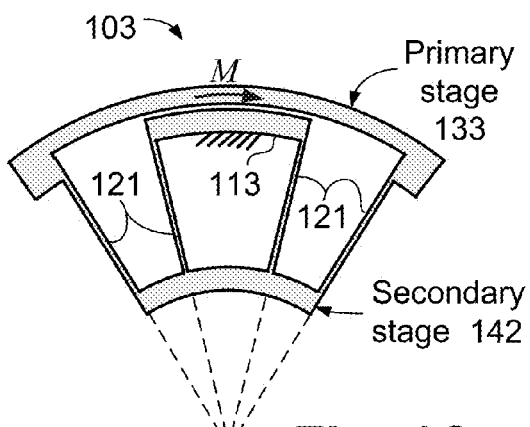
Figure 1D:
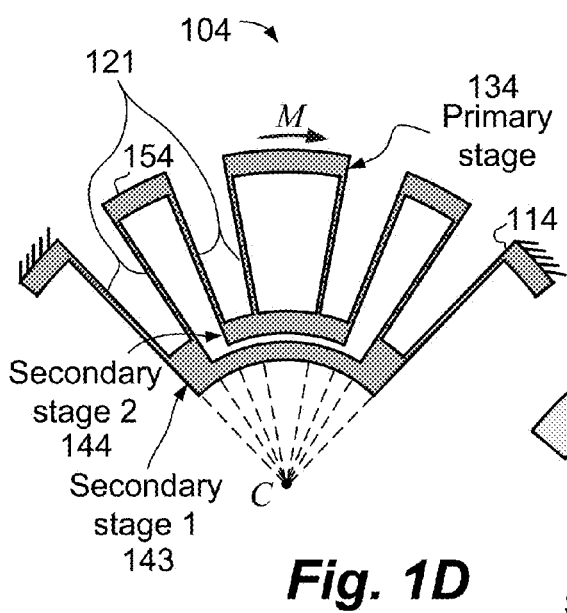
Figure 1E:
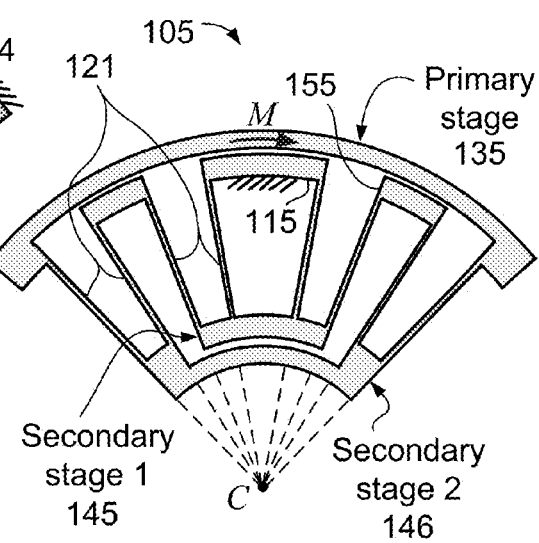

FIGS. 1A-1E are diagrams showing radial flexures 101-105, arranged in a progression of as a flow diagram of the radial flexures 101-105, and using the basic configuration of FIG. 1A. The configuration of FIGS. 1A-1E uses an outer base support, shown in FIGS. 1B-1E at 112-115, respectively. FIG. 1A depicts module 101 as a basic module. FIGS. 1B and 1C depict compound radial flexures 102, 103. FIGS. 1D and 1E depict multiple-segment compound radial flexures 104, 105.

Each of the radial flexures 101-105 uses radial flexure connections 121 to connect base supports 112-115 (not shown in FIG. 1A) to microscope stages, which may include one or more intermediate stages. As depicted in FIGS. 1B-1E, base supports 112-115 are connected via flexure connections 121 to primary stages 132-135. One or more secondary stages 141-146 are intermediate the respective base supports 112-115 and primary stages 132-135. The configurations of FIGS. 1B and 1C use one secondary stage 141, 142. The configurations of FIGS. 1D and 1E use multiple secondary stages 143, 144 or 145, 156. In the case of multiple secondary stages 143, 144 or 145, 146, sequential secondary stages 143, 144 or 145, 146 and intermediate links 154, 155 are connected serially between base support 114, 115 and the respective primary stage 134 or 135.

It is noted that, in the configurations of FIGS. 1D and 1E, the described micropositioning stage is comprised of multiple intermediate stages or segments 143, 144 or 145, 146, each having input 114 or 115 and output 134 or 135 platforms. Therefore, the micropositioning stage 104 or 105, meaning the overall microscope specimen supporting device or other working platform, has a multiple-segment construction.

To cope with the problem of achieving a large rotational range while maintaining a compact stage size using compound radial flexures (CRFs), the concept of multiple-segment compound radial flexure (MCRF) is implemented. The MCRF provides a rotary stage with enlarged rotational angle as well as compact physical dimension. Specifically, an MCRF is composed of multiple (N) basic modules, as depicted in FIG. 1A. For illustration, two MCRFs with different fixing schemes are depicted in FIGS. 1D and 1E, which are constructed using two basic modules, i.e., N=2.

A previously-constructed rotary stage was able to deliver a rotational angle of 10°; however, it is driven by a rotary voice coil motor (VCM) along the tangential direction of the output platform and its rotational angle is limited by the clearance between the moving coil and the stator of the VCM. To overcome this issue, a rotary VCM is employed to drive a large-range rotary stage. In addition, a new MCRF is configured to provide the stage architecture. To facilitate the parametric design, analytical models are established to predict the stage performance, which are verified by conducting finite element analysis (FEA) simulations. Preliminary results indicate that the reported flexure rotary stage is capable of delivering a larger rotational angle than those in existing configurations.

Design of Compound Radial Flexure

FIGS. 2A-2E are diagrams showing radial flexures 201-205, arranged in a progression of as a flow diagram of the radial flexures, and using the basic configuration of FIG. 2A. Unlike the configuration of FIGS. 1A-1#, flexures 201-205 uses an inner base support 212-215 (not shown in FIG. 2A). The diagrams in FIGS. 2B-2E show radial flexures 202-205 according to a multiple-segment compound radial flexure (MCRF) configuration, and the arrangement of FIGS. 2A-2E use an inner base support.

Each of the radial flexures 201-205 uses radial flexure connections 121 to connect base supports 212-215 (not shown in FIG. 2A) to microscope stages, which may include one or more intermediate stages. As depicted in FIGS. 2B-2E, base supports 212-215 are connected via flexure connections 121 to primary stages 232-235. One or more secondary stages 241-246 are intermediate the respective base supports 212-215 and primary stages 232-235. The configurations of FIGS. 2B and 2C use one secondary stage 241, 242. The configurations of FIGS. 2D and 2E use multiple secondary stages 243, 244 or 245, 256. In the case of multiple secondary stages 243, 244 or 245, 246, sequential secondary stages 243, 244 or 245, 246 and intermediate links 254, 255 are connected serially between base support 214, 215 and the respective primary stage 234 or 235. As is the case with FIGS. 1A-1E, the diagrams of FIGS. 2A-2E are arranged in a progression of as a flow diagram of the radial flexures. FIG. 2A depicts a basic module. FIGS. 2B and 2C depict compound radial flexures. FIGS. 2D and 2E depict multiple-segment compound radial flexures.

The basic configuration for the disclosed compound radial flexure module devise CRFs and MCRFs is shown in FIG. 2A. MCRFs are illustrated in FIGS. 2B-2C and FIGS. 2D-2E, respectively. It is notable that the CRFs comprise one basic module, i.e., N=1. Without loss of generality, the MCRFs are constructed using two basic modules, i.e., N=2, although more basic modules can also be adopted.

Rotational Angle

FIGS. 3A-3F are diagrams showing parameters and free-body diagrams of a multiple-segment compound radial flexure, showing parameters and free-body diagrams, using the example of radial flexure 204 shown in FIG. 2D. FIG. 3A shows an external moment M applied at the primary stage of the MCRF. FIGS. 3B-3E show the deformations of four flexures AiBi (i=1 to 4). The free-body diagram of the primary stage of the MCRF is given in FIG. 3F.

To calculate the rotational angle of the primary stage due to the action of an external torque M, the deformations of the four flexures $A_iB_i$ (i=1 to 4) are depicted in FIG. 3B-3E.

Taking the MCRF as shown in FIG. 2D as an example, its performance is analyzed with reference to FIGS. 3A-3F. As shown in FIG. 3A, when an external moment M is applied at the primary stage of the MCRF, the primary stage rotates around the remote center point C. Due to the same length l of the eight leaf flexures, these flexures experience the identical magnitude of deformation. Moreover, a pure rotation is generated by the primary stage without parasitic motions. Instead, parasitic translations toward the primary stage along the radial direction are borne by the two secondary stages. To facilitate a performance evaluation of the stage, analytical models are established as following.

Analytical modeling will be explained in association with the stage's rotational angle, torsional stiffness and stress analysis.

Referring to FIG. 3B, it is observed that the free end $A_1$ of the flexure $A_1B_1$ suffers from a moment m as well as a force f along the tangential direction. Hence, the free end $A_1$ translates a linear displacement d along the tangential direction. Given the translation d, the free end $A_1$ rotates around the center point C by an angle $\Theta_1$.

Taking into account the boundary conditions in terms of the translational displacement and rotational angle of the free end $A_1$, the following relationships are derived:

$$\frac{fl^3}{3EI} - \frac{ml^2}{2EI} = d \qquad (1)$$

$$\frac{fl^2}{2EI} - \frac{ml}{EI} = 0 \qquad (2)$$

where E is the Young's modulus of the material and $I=bh^3/12$ is the moment of inertia.

The force f can be determined from (2) as follows:

$$f = \frac{2m}{l}. \qquad (3)$$

Due to a small magnitude of rotation, the angle $\Theta_1$ can be expressed approximately by the translational displacement d:

$$\Theta_1 = \frac{d}{R}. \qquad (4)$$

Concerning the deformation of the flexure $A_2B_2$ as shown in FIG. 3C, a rotation $\Theta_1$ of the entire flexure $A_2B_2$ is induced by the deflection of $A_1B_1$. In addition, the free end $B_2$ also experiences a tangential translation d. Hence, the total rotational angle of end point $B_2$ of the flexure $A_2B_2$ around the point C can be calculated as follows:

$$\Theta_2 = \Theta_1 + \frac{d}{r} \qquad (5)$$

Similarly, considering the deformations of the other two flexures $A_3B_3$ and $A_4B_4$ as shown in FIGS. 3D and 3E, respectively, their rotational angles are derived below:

$$\Theta_3 = \Theta_2 + \frac{d}{R} \qquad (6)$$

$$\Theta_4 = \Theta_3 + \frac{d}{r} \qquad (7)$$

Substituting (4), (5), (6) into (7) results in:

$$\Theta_4 = 2d\left(\frac{1}{R} + \frac{1}{r}\right). \qquad (8)$$

Then, inserting (1) into (8) and recalling (3) allows the calculation of the rotational angle:

$$\Theta_4 = \frac{ml^2(R+r)}{3EIRr} \qquad (9)$$

which represents the one-sided rotational angle of the MCRF with two basic modules, i.e., N=2.

For a general MCRF, the one-sided rotational angle can be deduced as follows:

$$\Theta = \frac{Nml^2(R+r)}{6EIRr} \qquad (10)$$

where N (N≥1) is the number of basic modules. It is noticeable that N=1 represents the special case of conventional CRF.

Torsional Stiffness

The free-body diagram of the primary stage of the MCRF is given in FIG. 3F. Considering the equilibrium of moment around the center point C, the following equation is obtained:

$$2fr + 2m - M = 0. \qquad (11)$$

Solving the external moment M from (11) and taking into account expression (3) gives:

$$M = \frac{4mr}{l} + 2m. \qquad (12)$$

Then, in view of expressions (12) and (10), the torsional spring constant of a general MCRF can be calculated as follows:

$$K = \frac{M}{\Theta} = \frac{12EIRr}{Nl^3} \qquad (13)$$

where N≤1 is the number of basic modules.

Stress Analysis

If the maximum moment $m_{max}$ is exerted by the flexures, the maximum stress $\sigma_{max}$ (determined by the yield strength $\sigma_y$ of the material) occurs at the outermost edge of the cross section, that can be calculated by:

$$\sigma_{max} = \frac{m_{max}h}{2I} \qquad (14)$$

which leads to expression of the maximum moment:

$$m_{max} = \frac{2\sigma_{max}I}{h}. \qquad (15)$$

Substituting (15) into (12) leads to the maximum external moment that can be experienced by the MCRF:

$$M_{max} = \frac{4\sigma_{max}I(2r+l)}{lh}. \quad (16)$$

In view of (13) and (16) as well as the relation R=r+l, the maximum one-sided rotational angle of the MCRF can be determined as:

$$\Theta_{max} = \frac{M_{max}}{K} = \frac{N\sigma_{max}l^2(R+r)}{3ERrh}. \quad (17)$$

Hence, the maximum overall rotational range of the MCRF is calculated as follows:

$$\tau_{max} = 2\Theta_{max} = \frac{2N\sigma_{max}l^2(R+r)}{3ERrh} \quad (18)$$

where r=R−l.

Equation (18) reveals that the maximum rotational range of the MCRF is governed by the length l and the thickness h of the leaf flexures as well as the radius R of the stage for a given material. To obtain a larger angle $\tau_{max}$, the conventional CRF (N=1) should be designed with a larger length, smaller thickness, and larger outer radius. In practice, the physical parameters l and R are restricted by the compactness requirement of the stage, and h is limited by the manufacturing tolerance and the requirement on the minimum stiffness which determines the natural frequency. Therefore, constructed by leaf flexures with the identical physical parameters (l, h, and R), the maximum rotational angle of the disclosed MCRF is enlarged by N times as compared with the conventional CRF. Based on the concept of MCRF, a novel rotary stage is designed in the following section to achieve a large rotational motion.

Figure 4A:
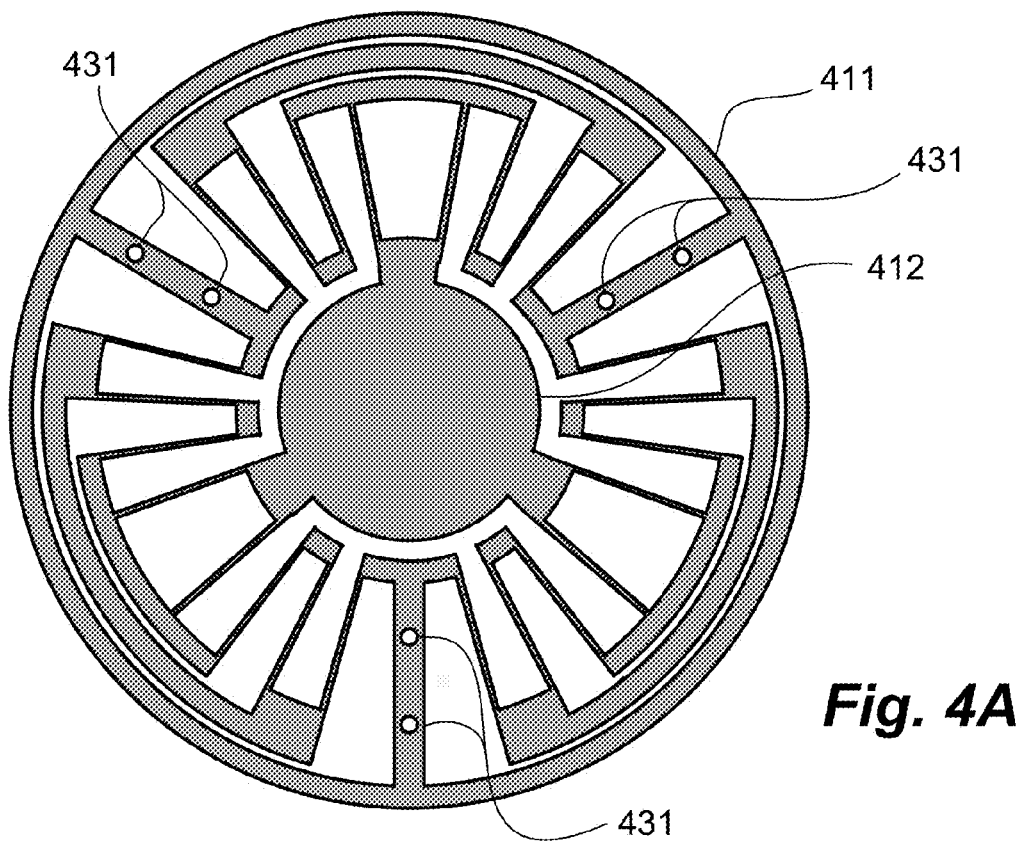
FIGS. 4A and 4B are schematic diagrams showing two rotary stages which are constructed by three multiple-segment compound radial flexures.
Figure 4B:
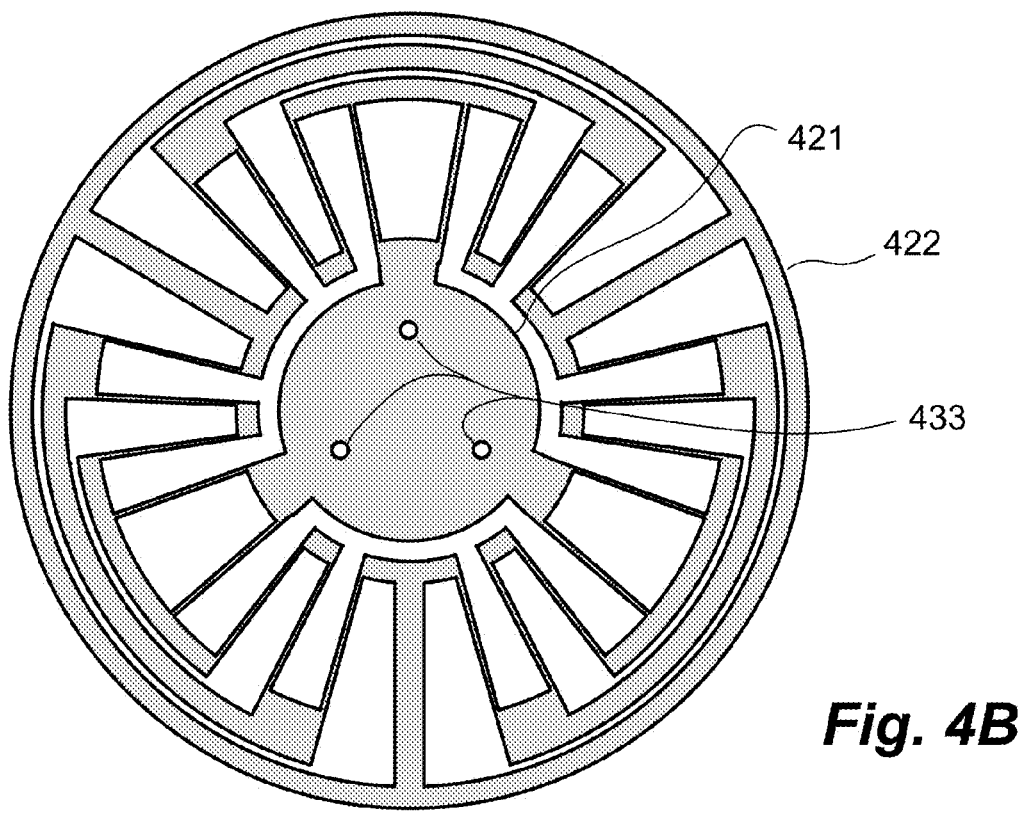

FIGS. 4A and 4B are schematic diagrams showing two rotary stages which are constructed by three multiple-segment compound radial flexures. FIG. 4A shows an inner stage used as an output stage. FIG. 4B shows the outer frame is used as output stage.

Design of Rotary Stages

By employing three MCRFs (N=2), two rotary stage are devised as shown in FIG. 4, which have different fixing schemes. Specifically, in FIG. 4A outer frame 411 of the first stage is fixed and inner stage 412 acts as the output platform. In FIG. 4B, inner stage 421 is fixed and outer frame 422 is provided as the output stage.

The fixed and output stages can be established by mounting arrangements. Specifically, in FIG. 4A, outer frame 411 of the first stage is depicted with screw holes 431 for use with fasteners (not shown). The fasteners established the fixed position of outer frame 411. In FIG. 4B, the inner stage 421 is depicted with screw holes 433 and fasteners (not shown) fixed inner stage 421 and allow outer frame 422 to rotate as the output stage. In both arrangements, three MCRFs are used since two MCRFs may result in an out-of-plane bending deformation of the stage with an external load exerted on, while four or more MCRFs lead to smaller clearance between the flexures, hence, producing a smaller rotational angle of the stage. The fasteners are given for illustration, and any convenient mounting arrangement can be used.

For illustration, the design process of the first stage is outlined in this section by taking into account the actuation and sensing issues. It is notable that N=3 or more can also be used to construct the MCRFs. The design procedures are almost identical to the ones presented here.

Actuation Issues

To produce a large rotational angle, a rotary VCM is used to drive the rotary stage to rotate around the center point C. Specifying the rotational range of the stage as $\pm\Phi_{max}$, the maximum one-sided rotation $\Phi_{max}$ should stay within the maximum one-sided reachable range as described below to guarantee the safety of the material:

$$\Phi_{max} \leq \frac{2\sigma_{max}l^2(R+r)}{3ERrh} \quad (19)$$

which is determined from (18) with N=2.

As a rotary actuator, the VCM consists of a permanent magnetic rotor and a stator which is a hollow cylinder encompassed by a coil of copper wire. To ensure proper operation, the VCM with appropriate torque and stroke capabilities are selected in the following discussions.

Since the rotary stage is composed of three MCRFs which are connected in parallel, the stage's torsional stiffness can be calculated by (13) with N=2:

$$K_{stage} = 3K = \frac{18EIRr}{l^3}. \quad (20)$$

To achieve the maximum one-sided rotational angle $\Phi_{max}$, the required torque from the VCM motor is determined by:

$$M_{max} = K_{stage}\Phi_{max}. \quad (21)$$

Thus, the maximum driving torque of the VCM should satisfies:

$$M^{max}{}_{motor} \geq M_{max} = \frac{18EIRr\Phi_{max}}{l^3}. \quad (22)$$

Because the rotary stage is driven by the VCM motor directly, the total stroke of the VCM should meet the following requirement to ensure that the desired rotational range is achieved:

$$\Phi motor_{max} \geq 2\Phi_{max} \quad (23)$$

Therefore, the aforementioned conditions (19), (22), and (23) provide the guidelines for the design of stage parameters and the selection of VCM to guarantee the stage's rotational range $\pm\Phi_{max}$ and the material's safety.

Consideration on Sensing Issues

Here, the rotational angle is measured by a strain gauge sensor due to its compact size. To enhance the signal-to-noise ratio (SNR), the strain gauge is attached at the maximum-stress position of the leaf flexures. The position of the maximum stress can be determined by conducting FEA simulation.

Figure 5:
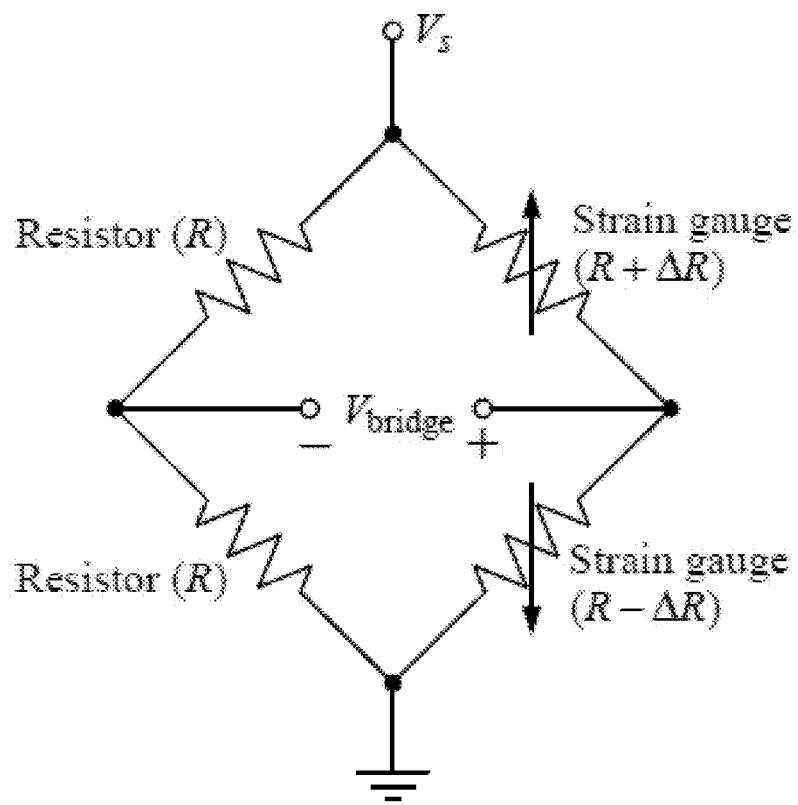
FIG. 5 is an electrical schematic diagram showing a half-Wheatstone bridge circuit for signal conditioning of strain gauge outputs.

FIG. 5 is an electrical schematic diagram showing a half-Wheatstone bridge circuit for signal conditioning of strain gauge outputs. The output voltage of the bridge circuit can be approximated as:

$$V_{bridge} = \frac{V_S}{2R} \times \Delta R \quad (24)$$

where $\Delta R$ and $R$ are the change value and nominal value of the gauge resistance, respectively. $V_S$ is the source voltage of the circuit.

For a strain gauge, the gauge factor is expressed as:

$$S = \frac{\Delta R}{R\varepsilon} \quad (25)$$

in which the strain $\varepsilon$ is related to the experienced stress $\sigma$ by:

$$\sigma = E\varepsilon \quad (26)$$

where E is the Young's modulus of the material.

Substituting (25) and (26) into (24) yields:

$$Vbridge = \frac{V_S S\sigma}{2E}. \quad (27)$$

To demonstrate a linear relationship between the stage's rotational angle $\Theta$ and the bridge output voltage Vbridge, one leaf flexure is selected for an analysis as follows.

Referring to FIG. 3, it is seen that the free end of each flexure undergoes a translation d in the tangential direction relative to the fixed end. The linear stiffness of the leaf flexure can be derived as:

$$K_t = \frac{Ebh^3}{l^3}. \quad (28)$$

Recalling (12), the following relationship can be obtained:

$$f = \frac{2m}{l} = K_t d \quad (29)$$

where the torque m can be derived from (14):

$$m = \frac{2\sigma I}{h} \quad (30)$$

with $\sigma$ denoting the experienced stress.

In addition, given expressions (4) and (8), the translation d can be related to the stage's rotational angle $\Theta$ through:

$$d = \frac{Rr\Theta}{2(R+r)}. \quad (31)$$

Inserting (30) and (31) into (29), a fundamental algebra operation gives:

$$\sigma = \frac{K_t Rrhl\Theta}{8I(R+r)}. \quad (32)$$

Then, substituting (32) into (27) allows the generation of:

$$Vbridge = \frac{V_S S K_t Rrhl\Theta}{16EI(R+r)}. \quad (33)$$

Furthermore, inserting (28) and the moment of inertia $I=bh^3/12$ into (33) yields:

$$Vbridge = Sangle\Theta \quad (34)$$

where the strain sensor's sensitivity Sangle is:

$$Sangle = \frac{3V_S SRrh}{4l^2(R+r)}. \quad (35)$$

Equation (34) indicates that the relation between the stage's rotational angle $\Theta$ and the strain gauge circuit output Vbridge is linear. In addition, expression (35) indicates that the sensor sensitivity Sangle is governed by the supply source voltage, the gauge factor, and the stage parameters. In practice, the sensitivity value Sangle of the strain sensor can be determined by calibration.

Performance Evaluation and Structure Improvement

In one non-limiting example, a rotary stage is constructed of Al-7075 alloy material, and is configured to produce a rotational range of ±5°. Based on the design criteria as expressed by (19), (22), and (23), the stage parameters are designed as shown in Table 1. The specifications of the adopted Al-7075 alloy material and VCM motor are also shown in Table 1:

TABLE 1

Main parameters of a rotary stage

| type | parameter | value | unit |
| --- | --- | --- | --- |
| structure | b | 10 | mm |
| structure | h | 0.6 | mm |
| structure | l | 26.0 | mm |
| structure | R | 39.0 | mm |
| material | Young's modulus | 71.7 | GPa |
| material | yield strength | 503 | MPa |
| material | Poisson's ratio | 0.33 | — |
| material | density | 2810 | kg/m³ |
| VCM | stroke | 40 | deg. |
| VCM | maximum torque | 1.05 | N-m |

Analytical Model Results

In the previous section, analytical models are established for the performance evaluation of the stage. Analytical model (17) predicts that the maximum one-sided rotational angle of the stage is 31.0°. Hence, the reachable rotational range of the stage is ±31.0.

By assigning the rotational range as ±5°, the required maximum torque and stroke for the VCM are $M_{max}^{motor} \geq 0.58$ N-m and $\Phi_{max}^{motor} \geq 10°$, which are predicted by (22) and (23), respectively. Comparing to the reachable rotational range of ±31.0°, the assigned value (±5° is obtained with a high safety factor of 6.2.

Static FEA Results

To verify the accuracy of the established models, FEA simulations are carried out with ANSYS software package. To access the static performance of the stage, a static structural simulation is conducted by applying a moment to the center stage, i.e., the output platform of the rotary stage.

Figure 6A:
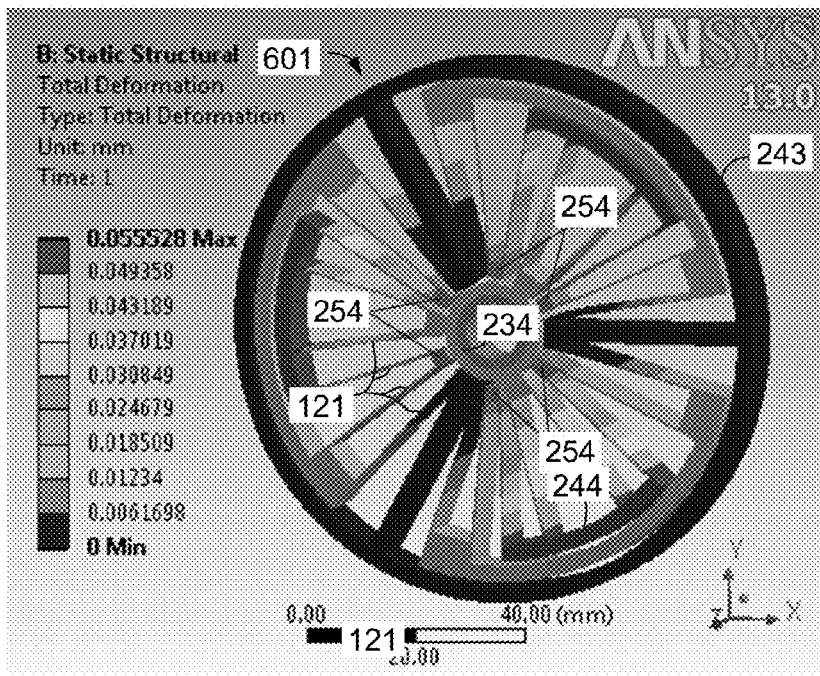
FIGS. 6A, 6B and 6C are schematic spectrographic diagrams showing depictions of finite element analysis (FEA) of a compound stage under a driving torque of 0.01 N–m.
Figure 6B:
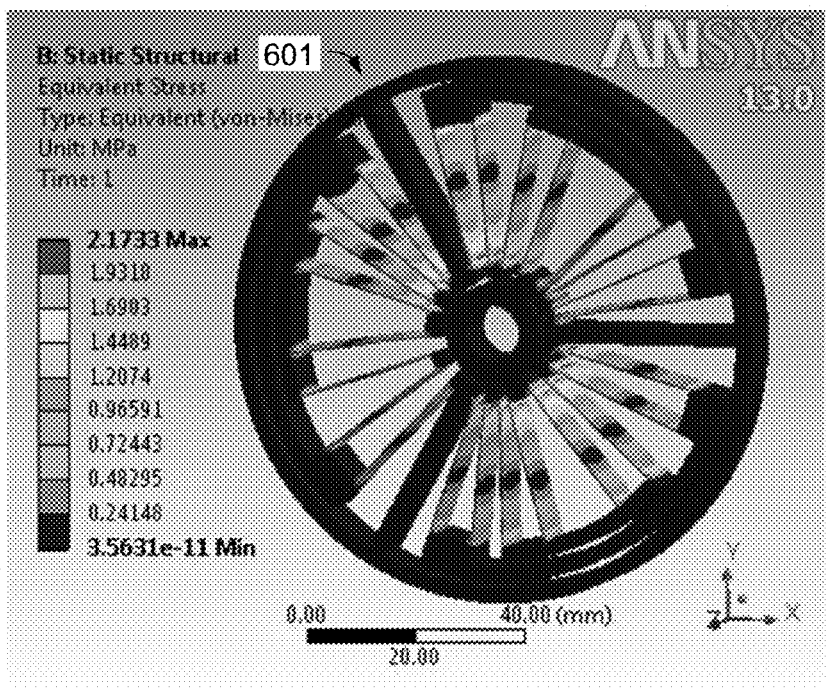
Figure 6C:
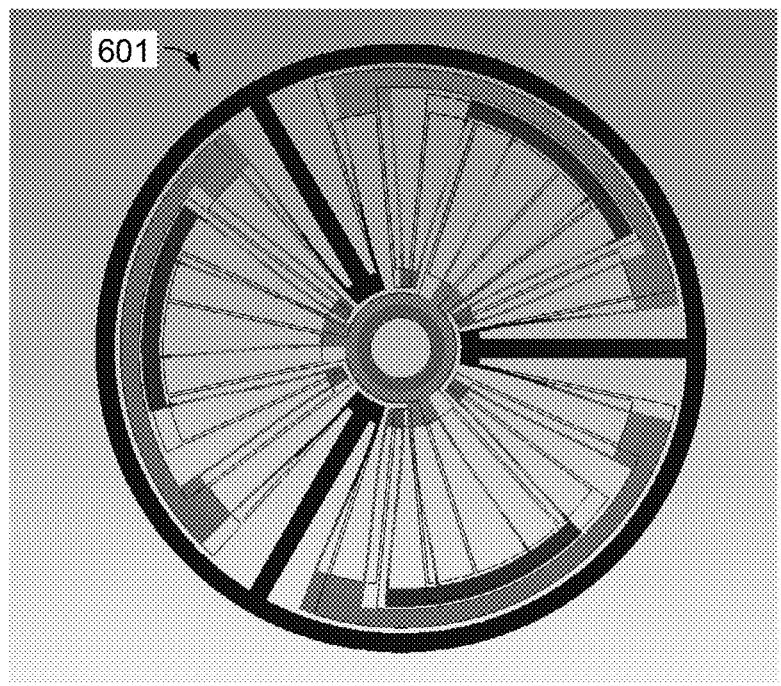

FIGS. 6A, 6B and 6C are schematic spectrographic diagrams showing depictions of finite element analysis (FEA) of a compound stage 601 having a configuration similar to that depicted in FIG. 2D and having corresponding component elements. The analysis is performed under a driving torque of 0.01 N–m in a clockwise direction. FIG. 6A shows the result of total deformation. FIG. 6B shows the result of distribution of equivalent stress (FIG. 6B). Under the driving torque of 0.01 N–m, the FEA, it is observed that the produced rotational angle is 0.101°. Hence, the torsional stiffness is derived as 5.68 N–m/rad. In addition, the induced maximum stress is 2.173 MPa, which occurs around the inner ends of the leaf flexures as shown in FIG. 6B. FIG. 6C shows different stages of the movement, with the solid lines showing the undeformed wireframe of the rotary stage before the movement. Due to an isotropic property of the material, the performance of the stage can be deduced from the FEA results. That is, the maximum rotational range of the stage is ±23.3°. To obtain a rotational angle of ±5°, the required maximum torque from the VCM is 0.50 N–m and the material exhibits a safety factor of 4.7. The results are summarized in Table 2:

TABLE 2

Stage Performances Evaluated by Analytical Models and FEA Simulation

| Performance | Model | FEA | Error (%) |
|---|---|---|---|
| Max. rotational range (degrees) | ±31° | ±23.3° | 33.5 |
| Torque requirement (N-m) | 0.58 | 0.50 | 16.0 |
| Material's safety factor | 6.30 | 4.66 | 33.0 |

In Table 2, model error is calculated with respect to FEA result. Taking the FEA result as the benchmark, the modeling errors are calculated as shown in Table 2. It is seen that the analytical model overestimates the rotational range, the required torque, and the material's safety factor by 33.5%, 16.0% and 33.0%, respectively. These discrepancies may be attributed to the assumption adopted in the analytical models, which only take into account the bending deformations of the leaf flexures. The model accuracy can be improved by conducting a nonlinear modeling approach.

In addition, by applying an external force on the top of the stage output platform, the out-of-plane payload capability of the rotary stage is tested. FEA results show that a payload of 14.4 kg can be sustained by the stage with the out-of-plane displacement maintained within 500 μm. The induced maximum stress is $\sigma_{max}$=187.3 MPa, which indicates a safety factor of 2.7 for the material.

Simulation Results—Dynamic FEA Results

Figure 7:
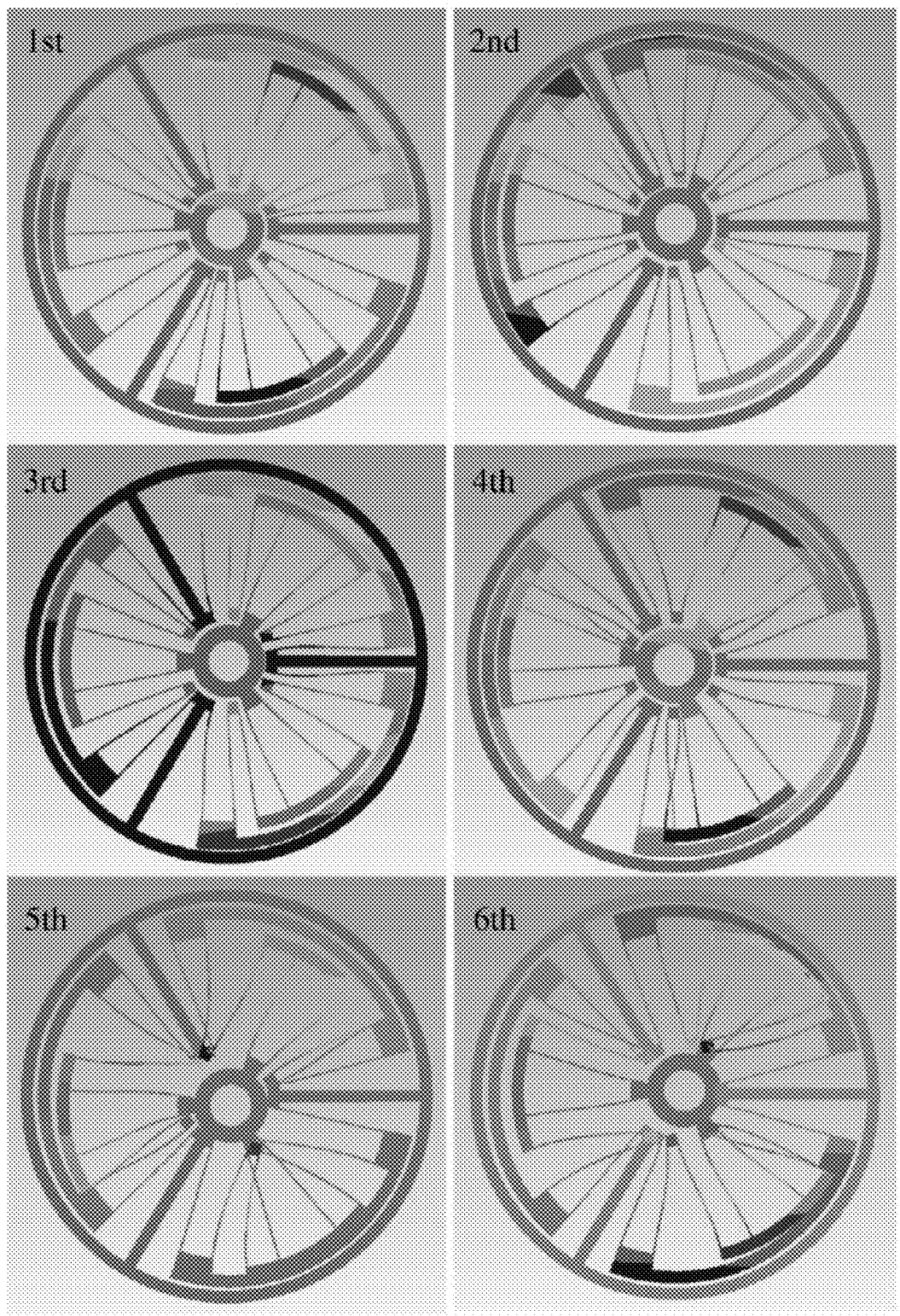
FIG. 7 is a grouping of schematic spectrographic diagrams showing the first-six mode shapes of the stage modeled in FIGS. 6A and 6B.

FIG. 7 is a grouping of schematic spectrographic diagrams showing the first-six mode shapes of the stage modeled in FIGS. 6A and 6B. The modal analysis is conducted to check the dynamic performance of the stage. The corresponding resonant frequencies are tabulated in Table 3 for the first-six mode shapes shown in FIG. 7:

TABLE 3

First-Six Resonant Frequencies of the Rotary Stage

| Mode Sequence | Frequency (Hz) |
|---|---|
| 1 | 83.10 |
| 2 | 117.02 |
| 3 | 111.07 |
| 4 | 162.45 |
| 5 | 213.04 |
| 6 | 213.16 |

It is found that the first mode arises from the dominant rotational motion. The second to six ones are the in-plane translations contributed by the multiple secondary stages. The simulation results predict the resonant modes which may be excited in the prototype as developed below.

Previously, the stage structure is improved by connecting the three sets of secondary stages, as shown in FIG. 6A, marked by a, b, and c using extra links to improve the natural frequency. For the rotary stage presented here, the first natural frequencies with and without the connecting links are 85.0 and 83.1 Hz, respectively. That is, the improvement on the natural frequency is only 2% which is not significant. Hence, unlike previous designs, such a structure improvement is not necessary from the natural frequency point of view. In this sense, the disclosed rotary stage design simplifies the stage architecture and the fabrication process compared to existing designs.

Prototype Configuration

Figure 8:
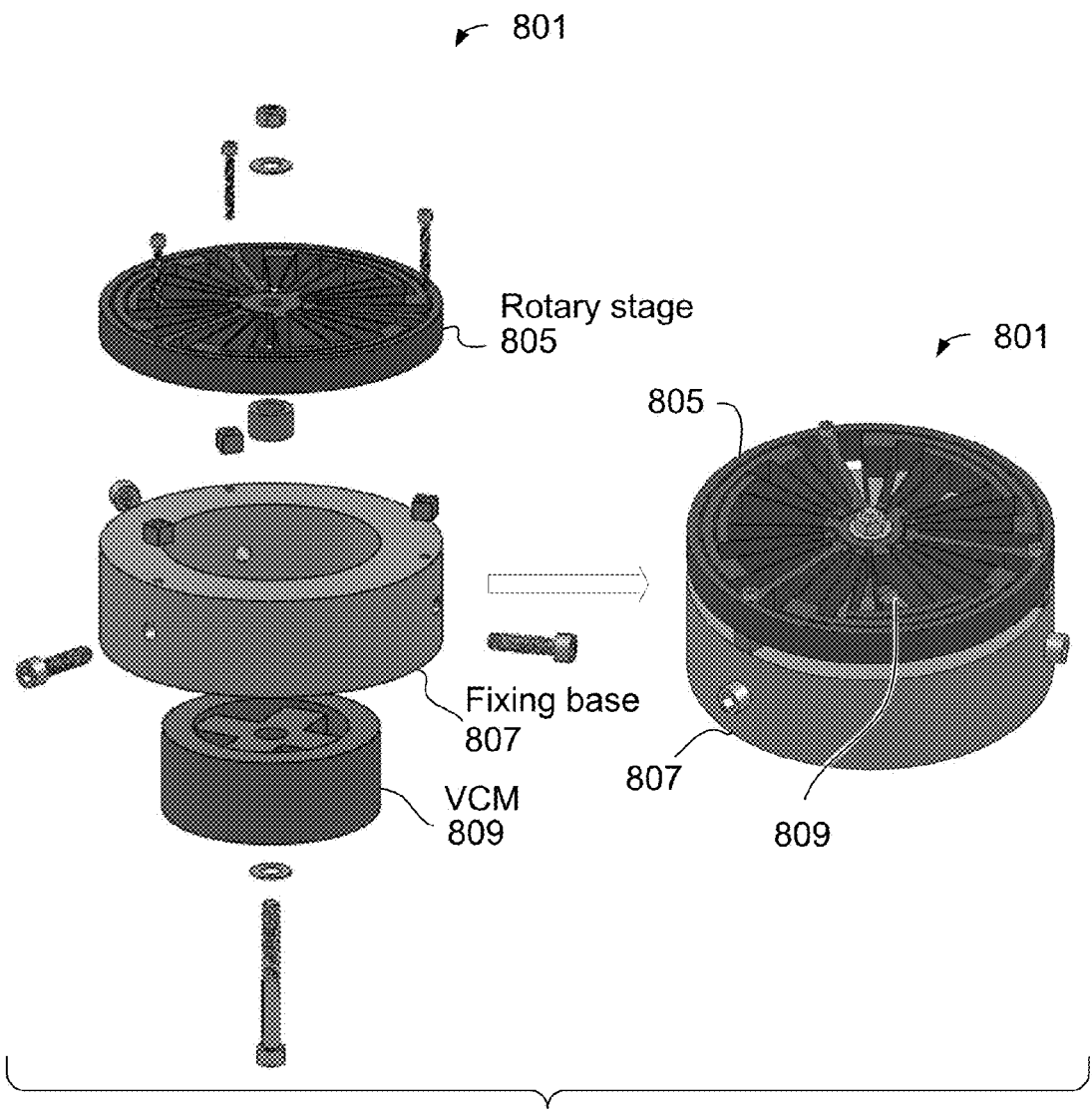
FIG. 8 is a CAD model of the designed rotary stage.

FIG. 8 is a CAD model of a compound rotary stage assembly 801 assembled with compound rotary stage 805. Compound rotary stage 805 has a configuration similar to that depicted in FIG. 2D, which is shown by way of non-limiting example. Depicted in exploded assembly version (left) and assembled (right) are rotary stage 805, fixed base 807 and rotary voice coil motor (VCM) 809.

Figure 9A:
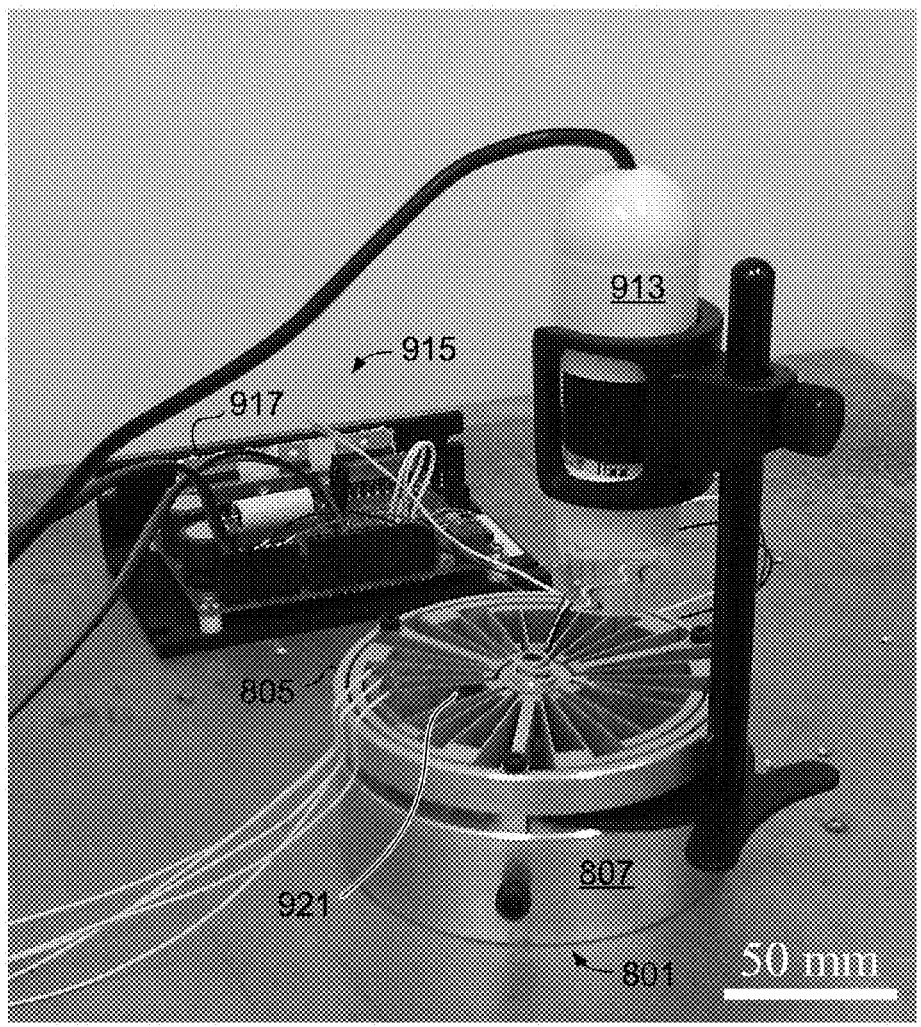
FIGS. 9A and 9B are photographic depictions of a rotary micropositioning system.
Figure 9B:
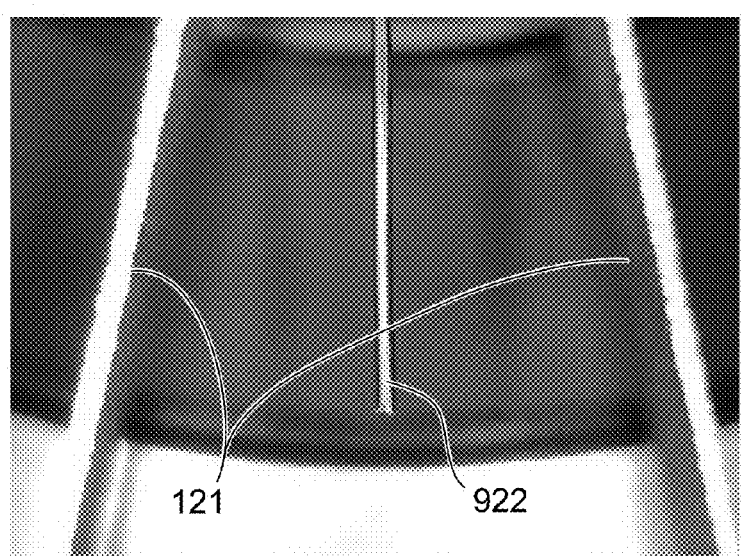

FIG. 9A depicts a prototype rotary micropositioning system. Depicted are compound rotary stage assembly 801 with microscope 913 and control circuitry 915. Control circuitry 915 uses a driver circuit 917 to drive VCM 809. FIG. 9B depicts details of the flexure arms. The monolithic rotary stage is fabricated using a piece of Al-7075 alloy by the wire-electrical discharge machining process. The stage exhibits a compact dimension with the diameter of 100 mm. A rotary VCM is chosen for the actuation by considering the torque and stroke requirements. In particular, the VCM (model: MR-040-25-025, from H2W Techniques, Inc.) is selected to deliver sufficient large torque and stroke as shown in Table 1. The rotational output motion of the stage is measured by two metallic strain gauges 921 (Model SGD-3/350-LY13, from Omega Engineering Ltd.), connected by wire connection 922, shown in FIG. 9B. The strain gauge owns a nominal resistance of 350Ω) and a gauge factor of S=2. FIG. 6(b) indicates that the maximum strain occurs around the inner ends of the leaf flexures. Hence, the strain gauges are glued at these maximum-strain positions.

To measure the half-bridge circuit output, a NI-9949 half-bridge completion accessory is used to complete the 350Ω sensor. The NI-9949 contains two high-precision resistors of 350Ω. The bridge output is acquired by using the NI-9237 bridge input module, which provides a high resolution of 24-bits.

Figure 10:
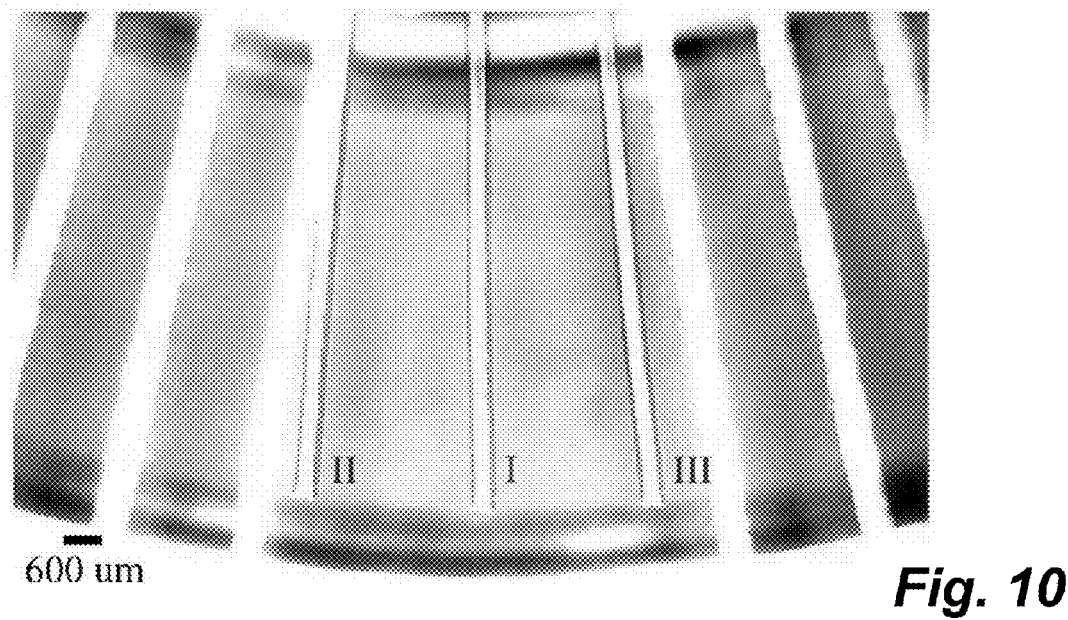
FIG. 10 is an image of an overlay image showing three frames or segments for three rotational positions of a copper wire fixed on the output platform of the rotary micropositioning system of FIG. 9.

FIG. 10 is an image of an overlay image showing three frames for three rotational positions of a copper wire fixed on the output platform of the rotary micropositioning system of FIG. 9. For the calibration of the strain sensors, the rotational motion of the rotary stage is also monitored by a digital microscope (magnification ratio: 200×) which captures the image of a copper wire attached on the rotary output platform. The rotational angle of the stage is calculated by image processing techniques. In addition, a NI cRIO-9022 real-time controller combined with NI-9118 chassis is adopted as the control hardware. LabVIEW software is employed to realize a deterministic real-time control of the system using a sampling rate of 5 kHz.

Performance Test for Static Performance

Figure 11A:
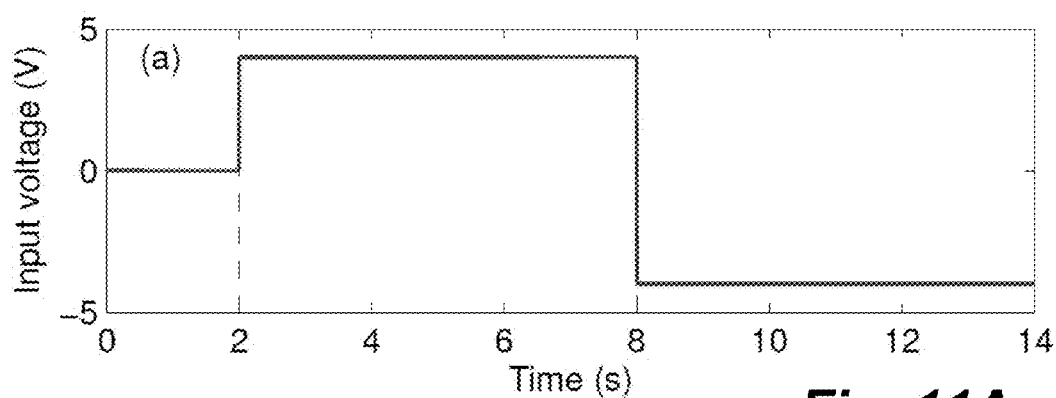
FIGS. 11A and 11B are circuit traces of signals applied to and sensed from a strain gauge used in the rotary micropositioning system of FIG. 9.
Figure 11B:
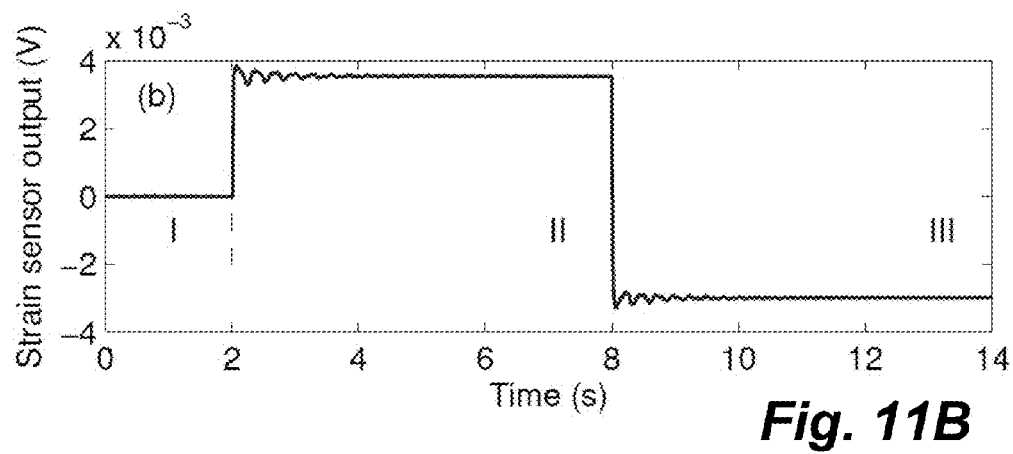

First, the rotational range of the stage is tested. FIGS. 11A and 11B are circuit traces of signals applied to and sensed from a strain gauge used in the rotary micropositioning system of FIG. 9. FIG. 11A is a circuit trace of a step signal applied to a VCM driver of the strain gauge. FIG. 11B is a circuit trace of the strain sensor's output.

By applying a step signal as shown in FIG. 11A to the VCM driver, the strain sensor's output is shown in FIG. 11B. The output angles of the stage at three positions (I, II, and III) are captured by the microscope. Then, the rotational angle is calculated from the overlay image depicted in FIG. 10, of three frames or segments, which correspond to the initial position (I) and two limit positions (II and III) as shown in FIG. 11B. By setting the angle in position I as the zero initial value, the output angles in the positions II and III are calculated as 5.951° and −5.002°, respectively. Hence, an overall rotational range of 10.953° is achieved.

By comparing the strain sensor's outputs at the limit positions (II and III) with the calculated angles, the sensor is calibrated using a gain of $1/S_{angle}=1680.8°/V$; i.e., the reciprocal of the sensor sensitivity. In addition, the equation (35) predicts a sensor gain value of $1/S_{angle}=1765.6°/V$. Compared to the observed results, the analytical prediction overestimates the sensor gain by 5%. The discrepancy may arises from the manufacturing errors and the variation on actual value of the strain gauge factor S.

Figure 12:
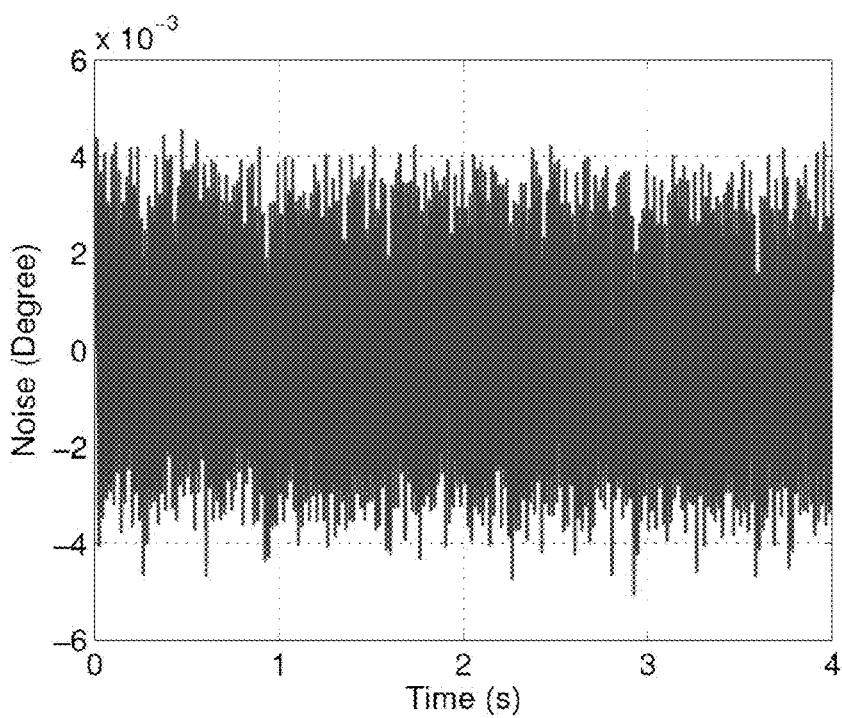
FIG. 12 is a diagram showing a noise signal of the strain sensor acquired using a sampling rate of 5 kHz, showing the time history of the noise signal.

In addition, the noise of the calibrated strain sensor is acquired With a zero voltage input to the rotary stage. To remove high-frequency components, a second-order Butterworth filter with a cut-off frequency of 40 Hz is used. FIG. 12 is a diagram showing a noise signal of the strain sensor acquired using a sampling rate of 5 kHz, showing the time history of the noise signal. The standard deviation is calculated as $\sigma=0.0024°$. By adopting $3\sigma$ as the resolution, the positioning resolution of the rotary stage is determined as 0.0072°.

Figure 13A:
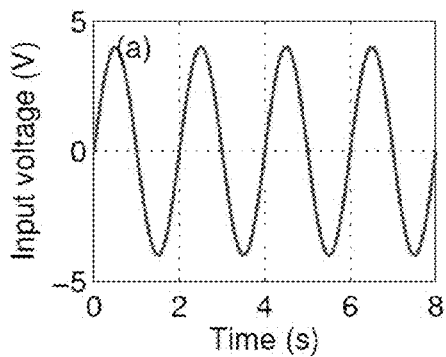
FIGS. 13A-13C are diagrams showing the relationship between voltage at the strain gauge and movement.
Figure 13B:
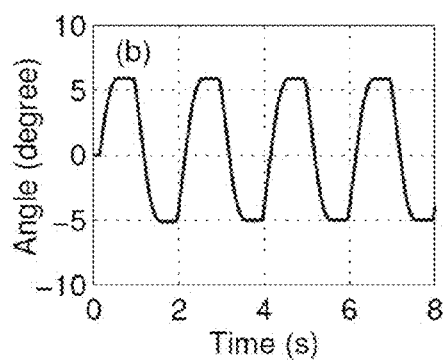
Figure 13C:
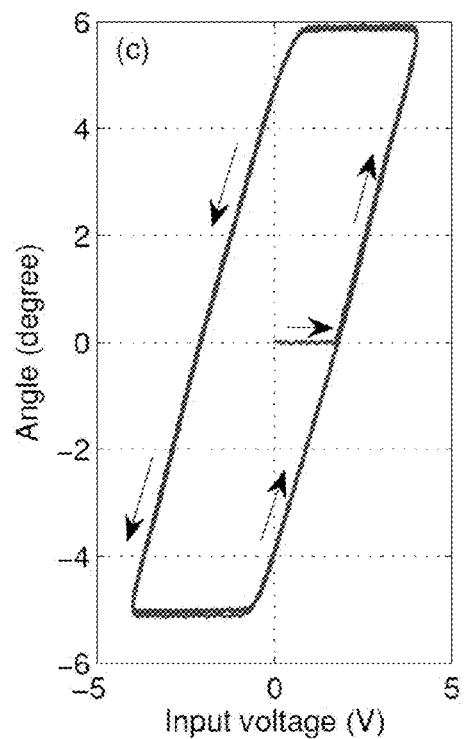
Figure 14A:
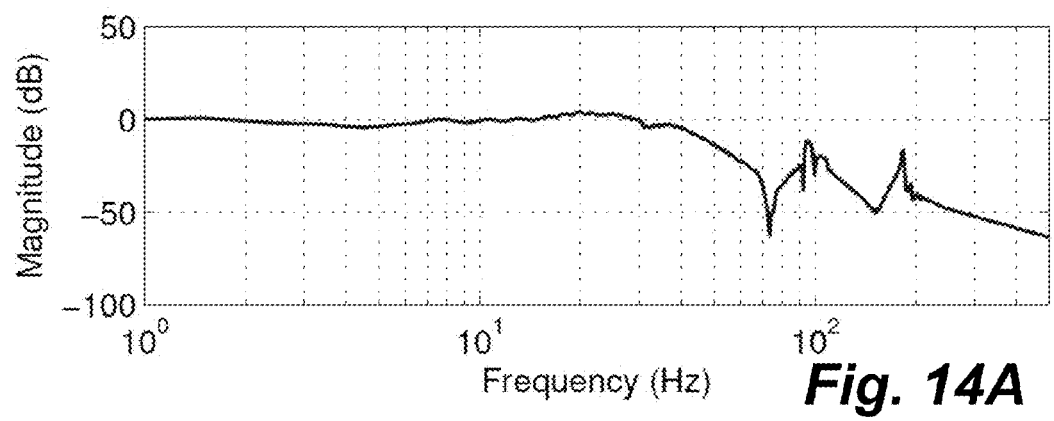
FIGS. 14A and 14B are Bode diagrams of the rotary stage of FIG. 9.
Figure 14B:
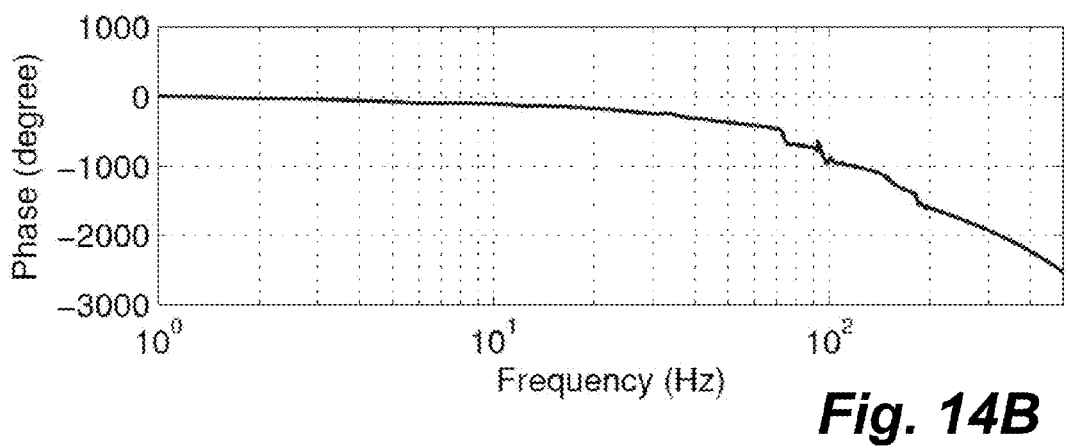

FIGS. 13A-13C are diagrams showing the relationship between voltage at the strain gauge and movement. FIG. 13A shows the input voltage over time. FIG. 13B shows output angle over time, as measured by strain sensor. FIG. 13C shows an output-input hysteresis of the measured angle based on input voltage. Driving the rotary stage using a 0.5-Hz sinusoidal voltage signal as shown in FIG. 13A, the output angle is measured by the strain sensor and the result is depicted in FIG. 13B. The output versus input curve is shown in FIG. 13C, which exhibits a hysteresis loop. The hysteresis mainly comes from the VCM motor, which works based on Lorentz force law. In order to achieve a precise positioning, a control technique is required to suppress the hysteresis nonlinearity Performance Test for Dynamic Performance FIGS. 14A and 14B are Bode diagrams of the rotary stage of FIG. 9. FIG. 14A shows a magnitude plot. FIG. 14B shows a phase plot (lower). The dynamic performance of the rotary stage is tested using the frequency response approach. Specifically, a swept-sine wave with the amplitude of 2V and the frequency ranging from 1 to 500 Hz is produced to drive the VCM. The output rotational angle is captured by the strain sensor. The frequency response is shown in FIG. 14, which is generated by the FFT algorithm. It is seen that the stage exhibits a weak resonant peaks around 21 Hz. As compared to the FEA simulation result of the first resonant frequency (83.1 Hz), the observed result is much lower.

Results

The foregoing observed results reveal that the developed rotary stage is able to deliver a rotational range of 10.953°, which is larger than the results as reported in prior techniques. The FEA simulation as conducted in Section 4.2 predicts a reachable rotational range of +23.3° for the rotary stage. Hence, the rotational range can be further increased by using a motor with larger driving torque.

The phenomenon that the bipolar rotational range is asymmetric with respect to zero may be caused by the manufacturing errors of the stage parameters and the assembly errors of the VCM and the rotary stage. Regarding the resonant frequency, the discrepancy between the observed and FEA simulation results mainly comes from the added mass (0.15 kg) of the rotor of VCM, which is not considered in FEA simulation. The resonant frequency can be enhanced by choosing a VCM with a lighter rotating rotor.

The out-of-plane load capability of the rotary stage can be enhanced by connecting each of three groups of secondary stages, identified by a, b, and c in FIG. 6(a), using a connecting bar. One group of secondary stages can be connected together because the two components experience the identical rotational displacement. Hence, the connection does not impose any constraint on the output motion of the rotary stage. By connecting these secondary stages, the out-of-plane stiffness is increased by twofold, which is evaluated by FEA simulation. As a result, the stage can support an out-of-plane load of 43 kg with a safety factor of 2.5 for the material. Compared to the loading weight of 14.4 kg for the stage without connecting bars, the load capability has been enhanced by almost twofold.

The reported rotary stage is applicable to precision engineering where a precise rotary positioning over a limited angle is required. It is anticipated that a more compact rotary stage will be produced by optimization of the design. The disclosed technique can also be extended to the design of large-range rotary stages with multiple axes.

In addition, the positioning resolution are dependent on the performance of the senses. Here, the strain gauge sensor is used since it enables a faster sampling rate than the visual feedback approach. Alternatively, rotary optical encoders with higher resolution and lower noise can be adopted to further improve the positioning resolution for the rotary positioning system. It is notable that it was determined that only the open-loop performance of the rotary stage need be tested. In the future, a closed-loop control scheme will be implemented and the positioning accuracy of the system will be characterized accordingly.

Additional States

Figure 15A:
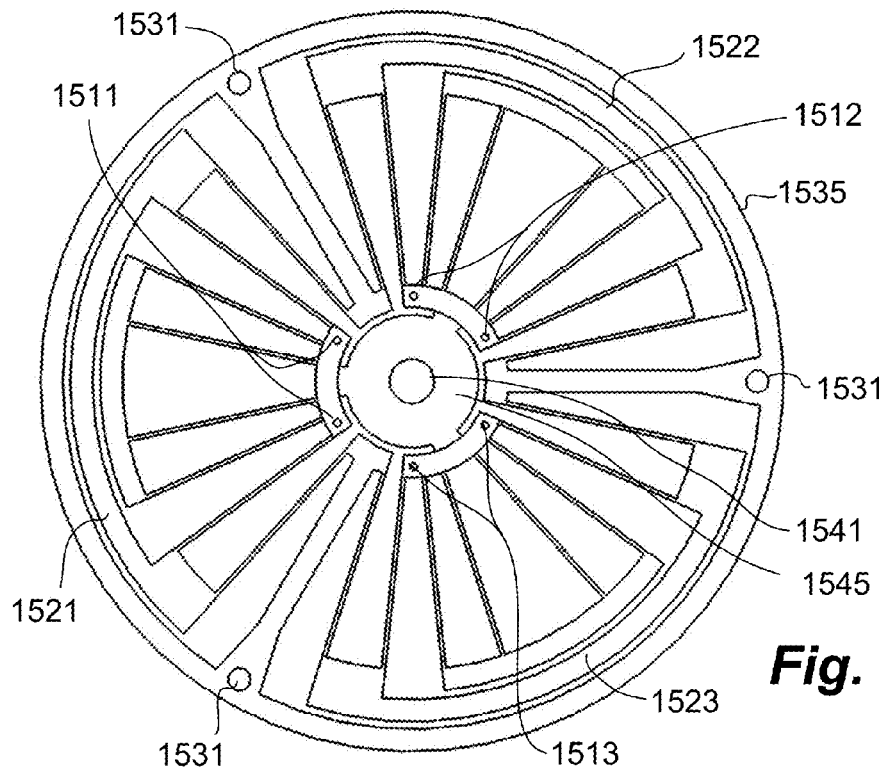
FIGS. 15A and 15B are diagrams showing a rotary bearing constructed by three multiple-segment compound radial fixtures.
Figure 15B:
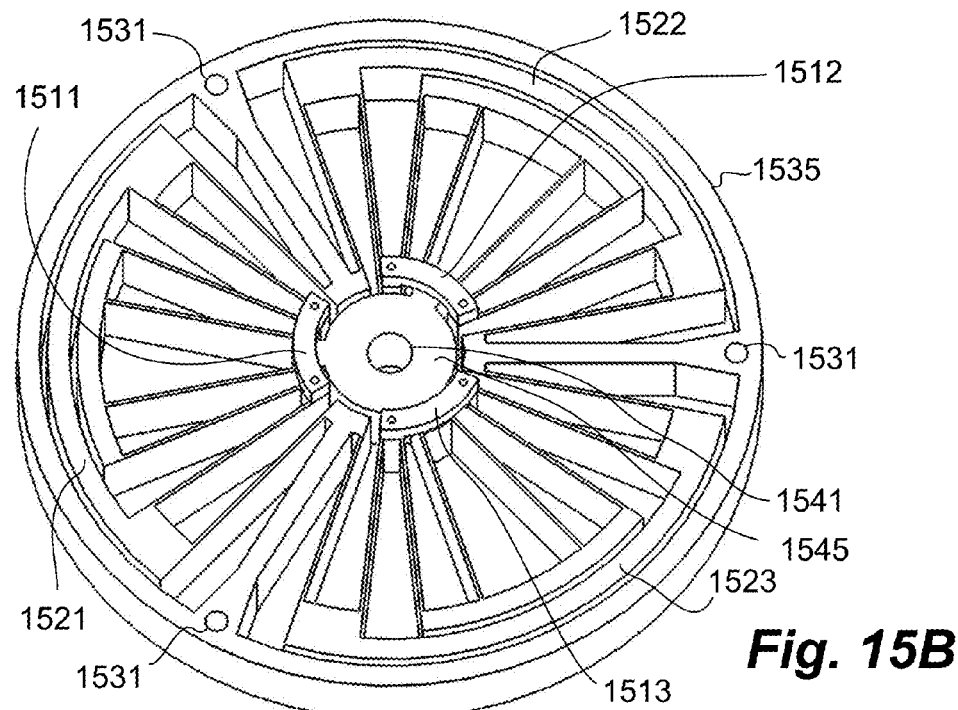

FIGS. 15A and 15B are diagrams showing a rotary bearing constructed by three multiple-segment compound radial fixtures. FIG. 15A is a plan view and FIG. 15B is an oblique view. To improve the radial stiffness and out-of-plane stiffness, of the bearing, three sets of connecting links arranged as pairs 1511, 1512, 1513 are used to connect six secondary components 1521, 1522, 1523. Mounting holes 1531 are used to fix an outer frame 1535. Center hole 1541 is used to fix inner stage 1547.

The rotary bearing constructed in this manner has the following advantages:
1. large stroke or range of rotation, typically over ±30°, high radial stiffness and low center shift value, representing a change in the x-y position of the rotation center of the rotary stage.
2. compact size, monolithic structure and a configuration which is easy to manufacture using a wire-electrical discharge machining (EDM) process.

CONCLUSION

This present disclosure describes a compact rotary flexible micropositioning stage with a large rotational range. The disclosed configuration can be applied in related domains, including by way of non-limiting examples, precision alignment in vacuum environments, optical and laser systems, micromanufacturing systems, microscopy and semiconductor manufacture.

Analytical models were established to predict the maximum rotational angle, torsional stiffness, and the required motor stroke and torque, which were validated by conducting finite element analysis simulations. Furthermore, the stage performances were tested by carrying out a collection of experimental studies on a prototype stage. The simulation and experimental results indicate that the stage is capable of rotary positioning with a resolution of 0.007° over a range of 10.953°. Moreover, the rotary stage possesses a compact physical dimension. In the future, control algorithms will be designed to realize a precise rotary positioning for the system.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A stage assembly for supporting articles, the stage assembly comprising:
   a base positioned at a first radius;
   one or more intermediate stage modules, comprising a first intermediate stage module positioned at a second radius positioned radially displaced from the first radius;
   a first plurality of compound radial flexures (CRFs) supporting the first intermediate stage module from a base, with the CRFs extending radially displaced from the base to the first intermediate stage module and allowing rotational movement of the intermediate stage module about a center axis;
   a second stage module located substantially at the second radius;
   a second plurality of CRFs supporting the second stage module from the first stage module and allowing rotational movement of the second stage module with respect to the first intermediate stage module about the center axis,
   wherein the CRFs each have a flat profile comprising a short side of the profile aligned planarly in a direction of the rotation of the stage modules and a long side aligned perpendicularly to the direction of rotation of the stage modules such that the CRFs have more flexibility in the direction of rotation than obliquely to the direction of rotation,
   and wherein movement of a last of the stage modules results in deflection of the CRFs between each successive stage module, with partial movement of each stage module between the base and the last of the stage modules, the last of the stage modules provided as a primary stage module.

2. The stage of claim 1, further comprising at least one further level stage module and a further plurality of CRFs supporting the further stage module from a previous stage.

3. The stage of claim 1, wherein:
   each set of CRFs between respective pairs of successive stage modules have equal numbers of CRFs, and each of the CRF has the same flexural strength of corresponding CRFs between different pairs of the successive stage modules,
   whereby an external moment applied at the primary stage causes the primary stage to rotate about a remote center point, thereby establishing a substantially linear correspondence between deflection of the CRFs and an angle of movement of the primary stage about the remote center point between 0° deflection and a predetermined angle of deflection.

4. The stage of claim 3, wherein:
   the CRFs having the same flexure strength of corresponding CRFs results in each of the successive stage modules rotating about the remote center point and the CRFs experiencing an identical magnitude of deformation.

5. A stage assembly for supporting articles, the stage assembly comprising:
   a base positioned at a first radius;
   one or more intermediate stage modules, comprising a first intermediate stage module positioned at a second radius positioned radially outward from the first radius;
   a first plurality of compound radial flexures (CRFs) supporting the first intermediate stage module from a base, with the CRFs extending radially outwardly from the base to the first intermediate stage module and allowing rotational movement of the intermediate stage module about a center axis;
   a second stage module located substantially at the second radius;
   a second plurality of CRFs supporting the second stage module from the first stage module and allowing rotational movement of the second stage module with respect to the first intermediate stage module about the center axis,
   wherein the CRFs each have a flat profile comprising a short side of the profile aligned planarly in a direction of the rotation of the stage modules and a long side aligned perpendicularly to the direction of rotation of the stage modules such that the CRFs have more flexibility in the direction of rotation than obliquely to the direction of rotation,
   and wherein movement of a last of the stage modules results in deflection of the CRFs between each successive stage module, with partial movement of each stage module between the base and the last of the stage modules, the last of the stage modules provided as a primary stage module.

6. The stage of claim 5, further comprising at least one further level stage module and a further plurality of CRFs supporting the further stage module from a previous stage.

7. The stage of claim 5, wherein:
   each set of CRFs between respective pairs of successive stage modules have equal numbers of CRFs, and each of the CRF has the same flexural strength of corresponding CRFs between different pairs of the successive stage modules,
   whereby an external moment applied at the primary stage causes the primary stage to rotate about a remote center point, thereby establishing a substantially linear correspondence between deflection of the CRFs and an angle of movement of the primary stage about the remote center point between 0° deflection and a predetermined angle of deflection.

8. The stage of claim 7, wherein:
   the CRFs having the same flexure strength of corresponding CRFs results in each of the successive stage modules rotating about the remote center point and the CRFs experiencing an identical magnitude of deformation.

9. A stage assembly for supporting articles, the stage assembly comprising:
   a base positioned at a first planar location;
   one or more intermediate stage modules, comprising a first intermediate stage module positioned at a second planar location displaced from the first planar location;

a first plurality of compound radial flexures (CRFs) supporting the first intermediate stage module from a base, with the CRFs extending laterally displaced from the base to the first intermediate stage module and allowing planar movement of the intermediate stage module about a center axis;

a second stage module located substantially at the second planar location;

a second plurality of CRFs supporting the second stage module from the first stage module and allowing planar movement of the second stage module with respect to the first intermediate stage module, wherein the CRFs each have a flat profile comprising a short side of the profile aligned planarly with respect to an alignment of the stage modules and a long side aligned perpendicularly with respect to an alignment of the stage modules such that the CRFs have more flexibility in planar movement than in non-planar movement, and wherein movement of a last of the stage modules results in deflection of the CRFs between each successive stage module, with partial movement of each stage module between the base and the last of the stage modules, the last of the stage modules provided as a primary stage module.

10. The stage assembly of claim 9, further comprising at least one further level stage module and a further plurality of CRFs supporting the further stage module from a previous stage.

11. The stage assembly of claim 9, wherein:

each set of CRFs between respective pairs of successive stage modules have equal numbers of CRFs, and each of the CRF has the same flexural strength of corresponding CRFs between different pairs of the successive stage modules, whereby an external moment applied at the primary stage causes the primary stage to rotate about a remote center point, thereby establishing a substantially linear correspondence between deflection of the CRFs and an angle of movement of the primary stage about the remote center point between 0° deflection and a predetermined angle of deflection.

12. The stage assembly of claim 11, wherein:

the CRFs having the same flexure strength of corresponding CRFs results in each of the successive stage modules rotating about the remote center point and the CRFs experiencing an identical magnitude of deformation.

* * * * *